United States Patent
Kimura et al.

[11] Patent Number: 6,161,519
[45] Date of Patent: Dec. 19, 2000

[54] COMBUSTION CONTROL DEVICE FOR DIESEL ENGINE

[75] Inventors: Shuji Kimura; Eiji Aiyoshizawa, both of Yokohama, Japan

[73] Assignee: Nissan Motor Co., Ltd., Yokohama, Japan

[21] Appl. No.: 09/261,119

[22] Filed: Mar. 3, 1999

[30] Foreign Application Priority Data

Mar. 3, 1998 [JP] Japan ................................. 10-050568

[51] Int. Cl.$^7$ ........................ F02D 41/04; F02D 41/40; F02M 25/07
[52] U.S. Cl. ...................... 123/299; 123/301; 123/435; 123/568.14
[58] Field of Search ................................. 123/299, 300, 123/301, 306, 315, 308, 435, 568.14, 90.15, 90.16, 90.17

[56] References Cited

U.S. PATENT DOCUMENTS

| | | | |
|---|---|---|---|
| 4,314,534 | 2/1982 | Nakajima et al. | 123/435 |
| 4,397,285 | 8/1983 | O'Neill | 123/435 |
| 4,463,729 | 8/1984 | Bullis et al. | 123/435 |
| 4,624,229 | 11/1986 | Matekunas | 123/435 |
| 4,704,999 | 11/1987 | Hashikawa et al. | 123/435 |
| 5,024,191 | 6/1991 | Nagahiro et al. | 123/90.16 |
| 5,113,828 | 5/1992 | Remboski et al. | 123/435 |
| 5,313,920 | 5/1994 | Matsushita | 123/435 |
| 5,692,464 | 12/1997 | Kimura | 123/90.15 |
| 5,778,857 | 7/1998 | Nakamura et al. | 123/435 |
| 5,845,613 | 12/1998 | Yoshikawa | 123/435 |
| 6,062,193 | 5/2000 | Gatellier | 123/435 |

FOREIGN PATENT DOCUMENTS 8-254134  10/1996  Japan.

*Primary Examiner*—Willis R. Wolfe
*Attorney, Agent, or Firm*—Foley & Lardner

[57] ABSTRACT

In a diesel engine which conducts exhaust gas recirculation and low temperature pre-mixed combustion at a low compression ratio, an ambient temperature at initiation of combustion which is determined by a compression ratio and an intake gas temperature or engine load is determined to be in a low temperature region which is lower than a first target temperature T1 which supports pre-mixed combustion or not. When the ambient temperature at initiation of combustion is determined to be in a region that is lower than a first target temperature T1, a temperature increase control device is operated which increases the temperature of the operational gases in the cylinder so that the temperature at initiation of combustion exceeds a first target temperature. The main fuel injection timing is placed in the range of 5°–20° of the combustion top dead center so that the main combustion temperature is above a fixed value. In this way, low temperature pre-mixed combustion is stabilized at low load at which combustion becomes unstable when compression ratios are low.

14 Claims, 20 Drawing Sheets

FIG.4
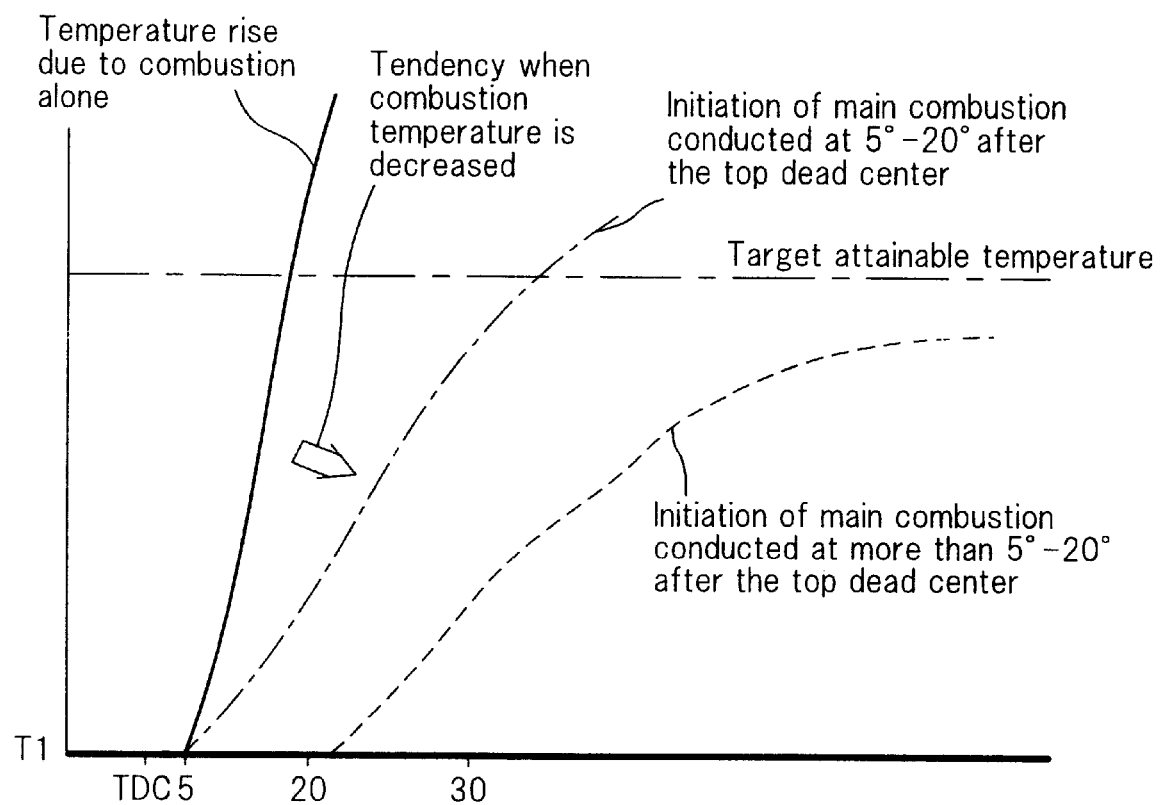
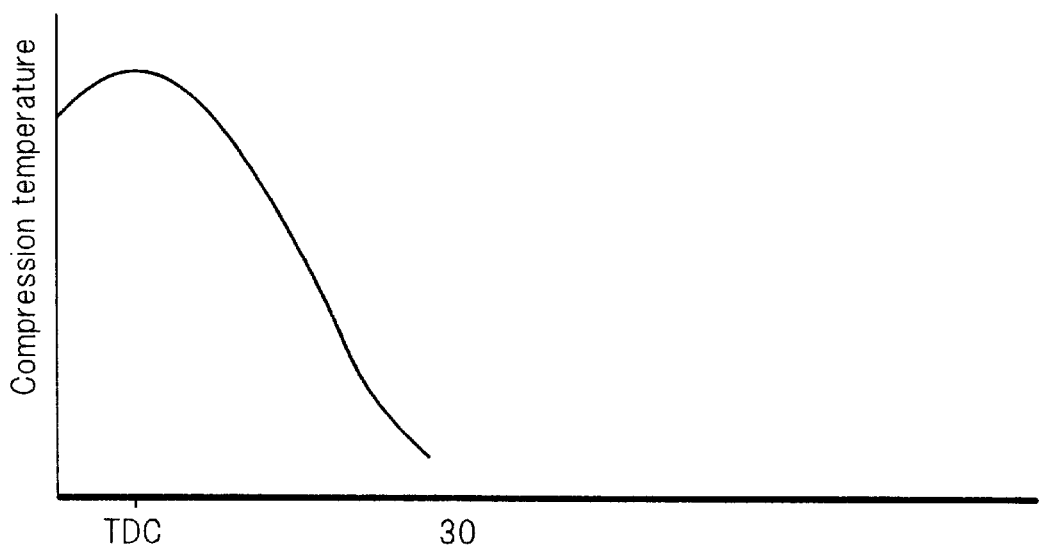

Target EGR Map

EGR rate $\dfrac{\text{EGR gas amount}}{\text{intake air amount}} \times 100\%$

Main injection timing Map

Target supercharging pressure MAP

Target pilot injection amount
Target pilot injection timing

COMBUSTION CONTROL DEVICE FOR DIESEL ENGINE

FIELD OF THE INVENTION

The present invention relates to a combustion control device for a diesel engine.

BACKGROUND OF THE INVENTION

Low temperature pre-mixed combustion is known as a method of combustion for a diesel engine in order to reduce particulate matter, $NO_x$ emissions and the like which are discharged from the engine. The method entails retarding the fuel injection timing until after the compression top dead center, in addition, by reducing oxygen concentration by exhaust gas recirculation (EGR), the fuel ignition lag period is lengthened and a gaseous pre-mixed, in which the fuel is in a sufficiently gaseous state, is formed during the fuel ignition lag period. Thus low temperature pre-mixed combustion can be performed at low oxygen concentrations.

An arrangement which performs low temperature pre-mixed combustion even under high engine load by operating the engine at an engine compression ratio which is lower than the normal engine compression ratio, is disclosed in Tokkai-Hei-8-254134.

When the engine compression ratio is high, the compression temperature is relatively raised, so that the initial combustion temperature (the ambient temperature in the cylinder at combustion initiation) rises. Since the combustion temperature further rises after initiation of combustion, it is not possible to perform low temperature pre-mixed combustion when the permissible range for low temperature pre-mixed combustion is exceeded. In particular since the combustion temperature is relatively high when the engine is operating at high load, it has only been possible to perform low temperature pre-mixed combustion at low engine load.

When the load on the engine increases, the temperature of intake gases increases due to the increasing temperature of the recirculated exhaust gases. In addition the actual compression ratio increases due to the intake compression created by a turbo-charger. As a result, the temperature at the initiation of combustion exceeds the temperature range for low temperature pre-mixed combustion and as a result, low temperature pre-mixed combustion has only been possible at low loads.

In contrast, if the compression ratio is lowered, the initial combustion temperature is relatively lowered and low temperature pre-mixed combustion becomes possible at higher engine load.

However if the combustion ratio is lowered, the initial combustion temperature may fall below critical levels at low engine load which results in unstable combustion at low load.

As a result, the conventional engine above raises oxygen concentrations during low engine load at which low temperature pre-mixed combustion can not be performed by reducing the EGR amount. In addition, by advancing the fuel injection timing, combustion initiation is advanced so as to stabilize combustion. However in such a case, $NO_x$ emissions are increased due to the advanced fuel injection timing and the reductions in EGR. Furthermore combustion noise is increased and fuel efficiency is reduced due to the fact that low temperature pre-mixed combustion can not be performed.

SUMMARY OF THE INVENTION

The object of the present invention is to provide an engine combustion control device which functions at a compression ratio which is lower than the normal compression ratio and which can perform low temperature pre-mixed combustion at a wide range of engine operating conditions.

In order to achieve the above object the present invention provides a diesel engine which has an exhaust gas recirculation system which performs low temperature pre-mixed combustion at a low compression ratio. The diesel engine comprises a fuel injection valve which varies a fuel injection timing, a temperature increase control device which raises an operational gas temperature in a combustion chamber, and a control unit which controls the fuel injection valve and the temperature increase control device. The control unit estimates an ambient temperature in a cylinder at initiation of combustion, decides whether or not the ambient temperature in a cylinder at initiation of combustion is in a region lower than a first target temperature which maintains low temperature pre-mixed combustion, performs temperature increase control by operating the temperature increase control device so that an ambient temperature at initiation of combustion exceeds a first target temperature, when it is determined that the ambient temperature at initiation of combustion is in a region which is lower than the first target temperature, and regulates a fuel injection timing of the fuel injection valve so that a combustion temperature increase rate is more than a fixed value.

The details as well as other features and advantages of the invention are set forth in the remainder of the specification and are shown in the accompanying drawings.

BRIEF DESCRIPTION OF THE DRAWINGS

FIG. 4 shows characteristic rises in temperature related to differences in the initial combustion period.

DESCRIPTION OF THE PREFERRED EMBODIMENTS

Figure 1:
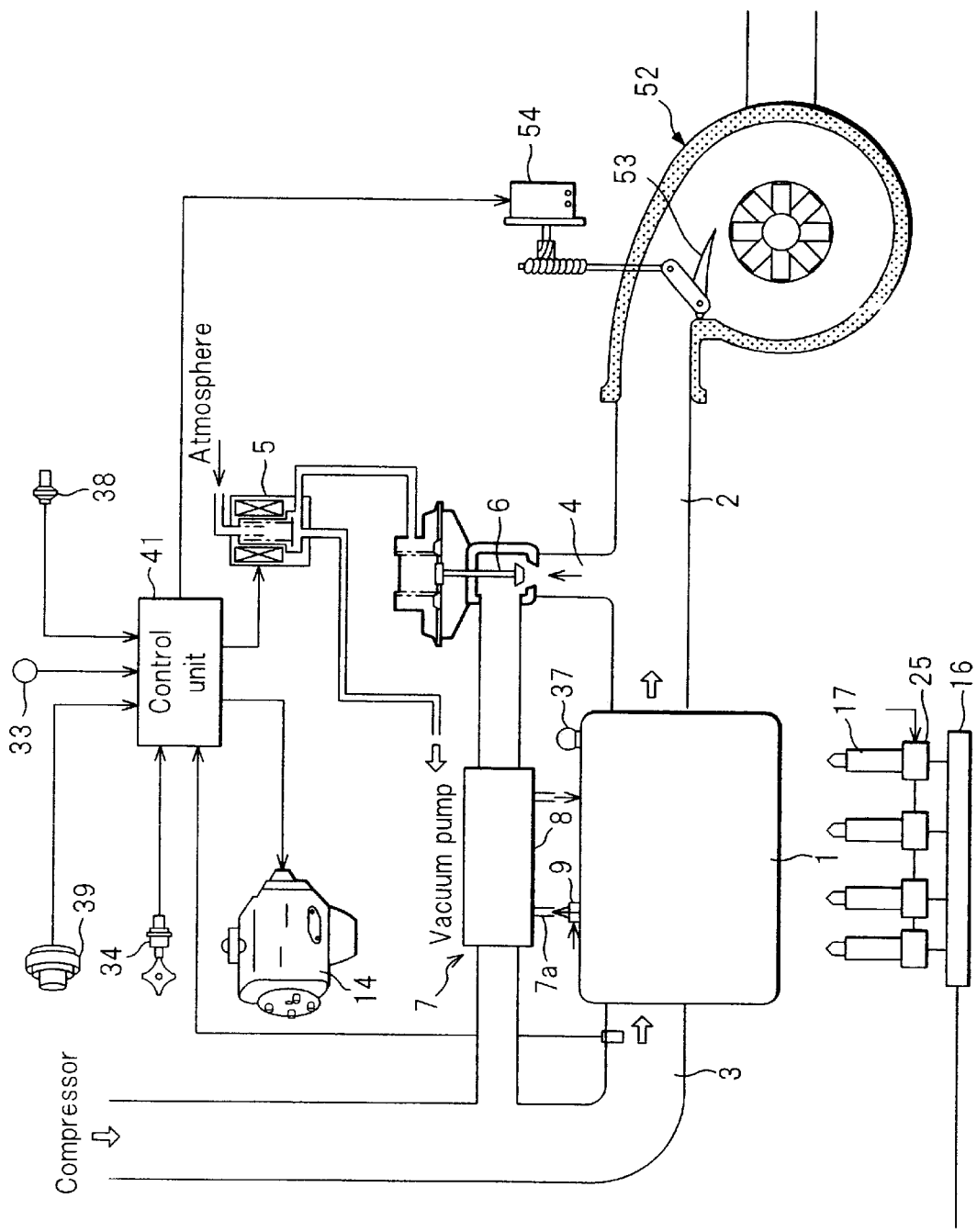
FIG. 1 is a schematic view of a first embodiment of the present invention.

FIG. 1 is a schematic view of a diesel engine. The amount of $NO_x$ generated during combustion in a diesel engine depends greatly on the combustion temperature. Reductions in $NO_x$ emissions are largely dependent on relatively lowering the combustion temperature. In a low temperature pre-mixed combustion system, the concentration of oxygen is reduced by an exhaust gas recirculation system (EGR) in order to achieve low temperature combustion. Therefore the exhaust passage 2 and the intake passage 3 are connected by a EGR passage 4. A diaphragm-type EGR valve 6 is provided which operates in response to a control negative pressure from the negative pressure control valve 5 which is disposed along the EGR passage 4. As a result, a part of the exhaust gases are recirculated into the intake gases.

The negative pressure control valve 5 is driven by a duty control signal from a control unit 41 and an appropriate EGR ratio is obtained on the basis of the operating conditions of the engine. For example, the EGR ratio is at a 100% maximum in low rotation low load regions (the intake air amount and the EGR gas amount are equal). The EGR ratio decreases from that maximum value depending rises in rotation speed or rises in load Since exhaust gas temperature rises at high load, the intake temperature rises when the EGR gases are recirculated. Consequently the combustion temperature is also correspondingly raised and the ignition lag period for injected fuel is shortened and pre-mixed combustion is not achieved. Thus the EGR ratio is lowered as the load increases.

A cooling device 7 for EGR gases is provided along the EGR passage 4. The cooling device 7 is formed on the periphery of the EGR passage 4 and has a water jacket 8 into which a part of the engine cooling water is circulated. The amount of cooling water circulated is adjusted by a flow control valve 9 provided on the inlet 7a for the cooling water. Thus the EGR gases are cooled in proportion to the degree to which the aperture of the control valve 9 is increased by commands from the control unit 41.

A swirl control valve (not shown) is provided in the intake passage in the vicinity of the intake port of the engine. The aperture of the swirl control valve is controlled by the control unit 41. When the valve is closed in low rotation low load regions of the engine (where aperture is decreased), the flow speed of intake gases into the combustion chamber is increased and a strong swirl is generated in the combustion chamber. However when the strength of the swirl increases, the heat exchange ratio of the operational gases in the cylinder increases and the temperature of the operational gases is relatively lowered.

The combustion chamber (not shown) which is formed by a cavity in the piston has a large diameter toroidal shape. Since the piston cavity is formed in a cylindrical shape from the crown face of the piston to the bottom without any impediment to the mouth, a circular cone is formed in the bottom center. The circular cone allows improved mixture of fuel and air as well as avoiding any resistance to the swirl which flows in a revolving stream into the piston cavity during the later stage of compression.

In this way, a swirl is generated by the swirl control valve as disclosed above due to a cylindrical piston cavity without an impediment at the mouth. Thus the swirl is dispersed from the piston cavity to the outside of the cavity together with the downward stroke of the piston in the combustion process. Therefore the swirl is maintained even outside the cavity.

A turbo-charger is provided further downstream than the branching point of the EGR passage 4 in the exhaust gas passage 2. A variable vane 53 is provided in the scroll inlet of the exhaust gas turbine 52 in the turbo-charger which is driven by a step motor 54. The variable blade 53 is controlled by the control unit 41. Control is performed so that the vane takes a vane angle which increases the flow speed of exhaust gases entering the exhaust turbine 52 during low engine rotation speeds and so that when in a totally open state such exhaust gases enter the exhaust gas turbine 52 without resistance during high engine rotation speeds. As a result, a fixed supercharging pressure is obtained from the low rotation region of the engine. Furthermore the variable vane 53 is controlled according to driving conditions to a vane angle at which a desired supercharging pressure vane angle is obtained.

A common rail type fuel injection device 10 is provided in the engine. The fuel injection device 10 mainly comprises a fuel tank (not shown), a supply pump 14, a common rail (accumulator chamber) 16, and a fuel injection nozzle 17 which is provided in each cylinder. High-pressure fuel which is generated by the high-pressure supply pump 14 is accumulated in the common rail 16. The initiation and termination of injection can be freely controlled by the opening and closing of the nozzle needle 16 by a three-way valve 25 in the fuel injection nozzle 17. The fuel pressure in the common rail 16 is controlled to an optimum value as required by the operational characteristics of the engine by a discharge amount control mechanism (not shown) in the supply pump 14 and a pressure sensor (not shown).

The control of the fuel injection amount, the injection period, the fuel pressure and the like is performed by a control unit 41 which comprises a microprocessor. For this reason, an accelerator aperture sensor 33, a sensor 34 which detects the crank angle and the engine rotation speed, a sensor 35 for discriminating cylinders, and a water temperature sensor 36 are provided, signals from these components are input into the control unit 41. Based on these signals, the control unit 41 calculates a target fuel injection amount depending on the engine rotation speed and the accelerator aperture and the fuel injection timing. It then controls the ON period of the three way valve 25 corresponding to the target fuel injection amount. Furthermore the control unit 41 feedback controls fuel pressure of the common rail 16 detected by the pressure sensor (not shown) to correspond to a target pressure through the discharge amount control mechanism of the supply pump 14.

The fuel injection timing is retarded to less than a conventional fuel injection timing in order to realize low temperature pre-mixed combustion. As shown below, fuel injection is set so as to commence at a crank angle in a fixed range after the combustion top dead center. In this way, the ignition lag period of the injected fuel is lengthened. During this period the vaporized of the fuel is increased and thus it is possible to achieve ignition when the fuel is sufficiently mixed with air. Thus low temperature pre-mixed combustion is performed at a low oxygen concentration which depends on recirculated exhaust gases. Therefore $NO_x$ emissions can be reduced without increasing the emission of particulate matter.

Figure 2:
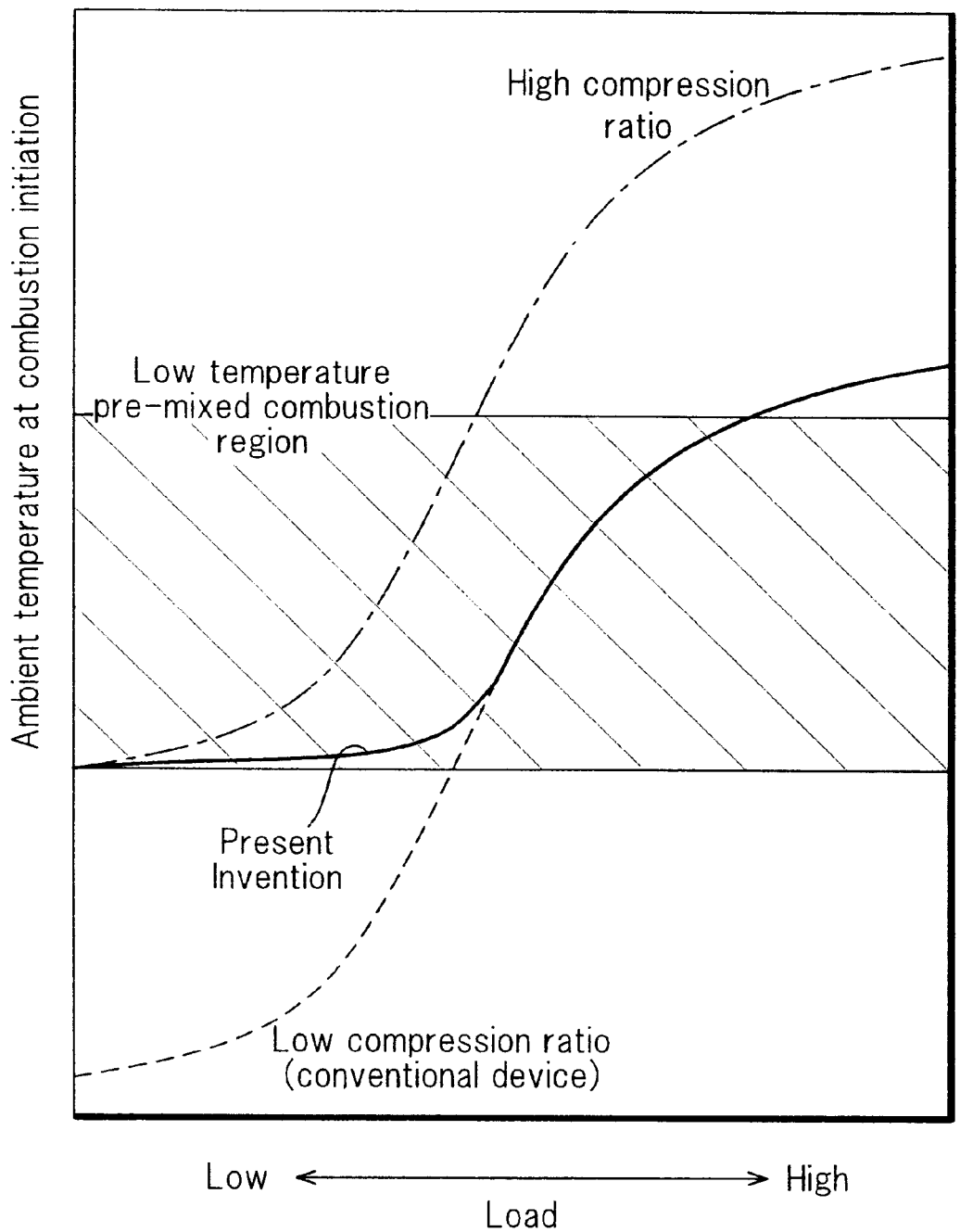
FIG. 2 shows the characteristics of initial combustion temperature with reference to engine load.

The combustion regions of low temperature pre-mixed combustion will now be explained. In FIG. 2, the region under the sloping line is the region in which low temperature pre-mixed combustion is possible. Low temperature pre-mixed combustion is not possible if the temperature is either higher or lower than this region.

When the compression ratio of the engine is high, the combustion temperature becomes excessively high at high load due to the fact the initial combustion temperature (the ambient temperature at initiation of combustion) is relatively high. Thus it is only possible to perform low temperature pre-mixed combustion at low load.

The temperature of exhaust gas recirculated with the intake gases increases at high load and thus the temperature of the intake gases increases. Furthermore the actual compression ratio increases due to the intake compression created by a turbo-charger. As a result, the temperature of gases in the cylinder at maximum compression rises even at the same compression ratio. Thus the temperature at the initiation of combustion increases.

However in a conventional engine such as that disclosed in Tokkai-Hei-8-254134, it is possible to shift the low temperature pre-mixed combustion towards high load by lowering the initial combustion temperature by lowering the compression ratio.

However as a consequence, if the initial combustion temperature becomes too low at low load, low temperature pre-mixed combustion also becomes extremely unstable at low load.

In order to achieve low temperature pre-mixed combustion at low load, the present invention sets the compression ratio of the engine to below 16, that is to say, to a level lower than that to which the engine is normally set, however the temperature increase control device is provided, disclosed below, which performs temperature increase control so that the combustion temperature is relatively increased during low load. The fuel injection timing is set, for example, between 5° to 20° after the top dead center and thus increases the rate of temperature increase after combustion initiation.

Figure 3:
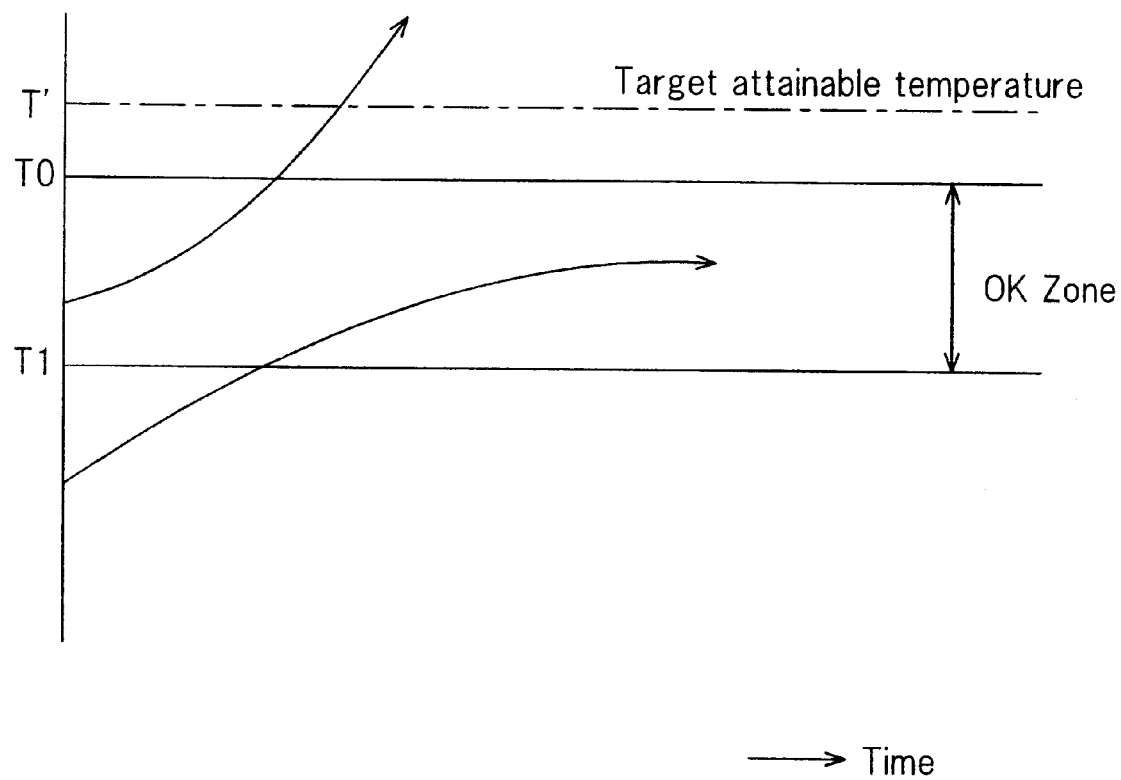
FIG. 3 shows the characteristics of a target attainable temperature and an initial combustion temperature range for low temperature pre-mixed combustion.

To explain this with reference to FIG. 3, the initial combustion temperature t2 is within the zone (in the temperature region from a target temperature T0 to a target temperature T1 (where however T1<T0) in which low temperature pre-mixed combustion, shown in the figure, is possible. When the initiation of main combustion is at a crank angle which is between 5° to 20° (experimental value) of the compression top dead center, a target attainable temperature T is always achieved after the initiation of combustion. In such a case, the fact that low temperature pre-mixed combustion is performed is confirmed by experimentation.

The target temperatures T0, T1, which determine the upper and lower limits of the zone in which low temperature pre-mixed combustion is possible, and the target attainable temperature T are values which are determined continuously from the fuel amount of main injection and the main injection timing.

In contrast, when the initial combustion temperature t2 is below a target temperature T1 which is necessary for low temperature pre-mixed combustion, it is not possible to reach the target attainable temperature T and low temperature pre-mixed combustion can not be performed.

When the initial combustion temperature t2 is below a target temperature T1, the present invention, as will be described below using FIG. 10, determines the target temperatures T2, T3, T4 (however where T1>T2>T3>T4) and increases the initial combustion temperature to a zone in which low temperature pre-mixed combustion is possible by performing temperature increase control in the above temperature regions.

Next the reason for the placement of the initiation of main combustion between 5° to 20° of the compression top dead center will be explained.

When the initiation of main combustion is immediately after the compression dead center, the temperature in the combustion chamber due to combustion, as shown in by the solid line in FIG. 4, tends to rise rapidly.

However the compression temperature actually falls as the piston moves away from the compression top dead center. Thus increases in temperature when the initiation of main combustion is at the upper dead point finally take the shape of a slowly rising curve as shown by the dotted line. Therefore low temperature pre-mixed combustion is possible if the target attainable temperature T is reached by a rise in temperature which contains the temperature by which the compression temperature has fallen. When main combustion is initiated at lower than 20° of the compression top dead center, since the compression temperature is greatly depressed, it is not possible to raise the temperature up to the target attainable temperature T as shown by the dotted line. Thus the limit for the initiation of main combustion on the delay side is 20° of the compression top dead center.

Figure 5:
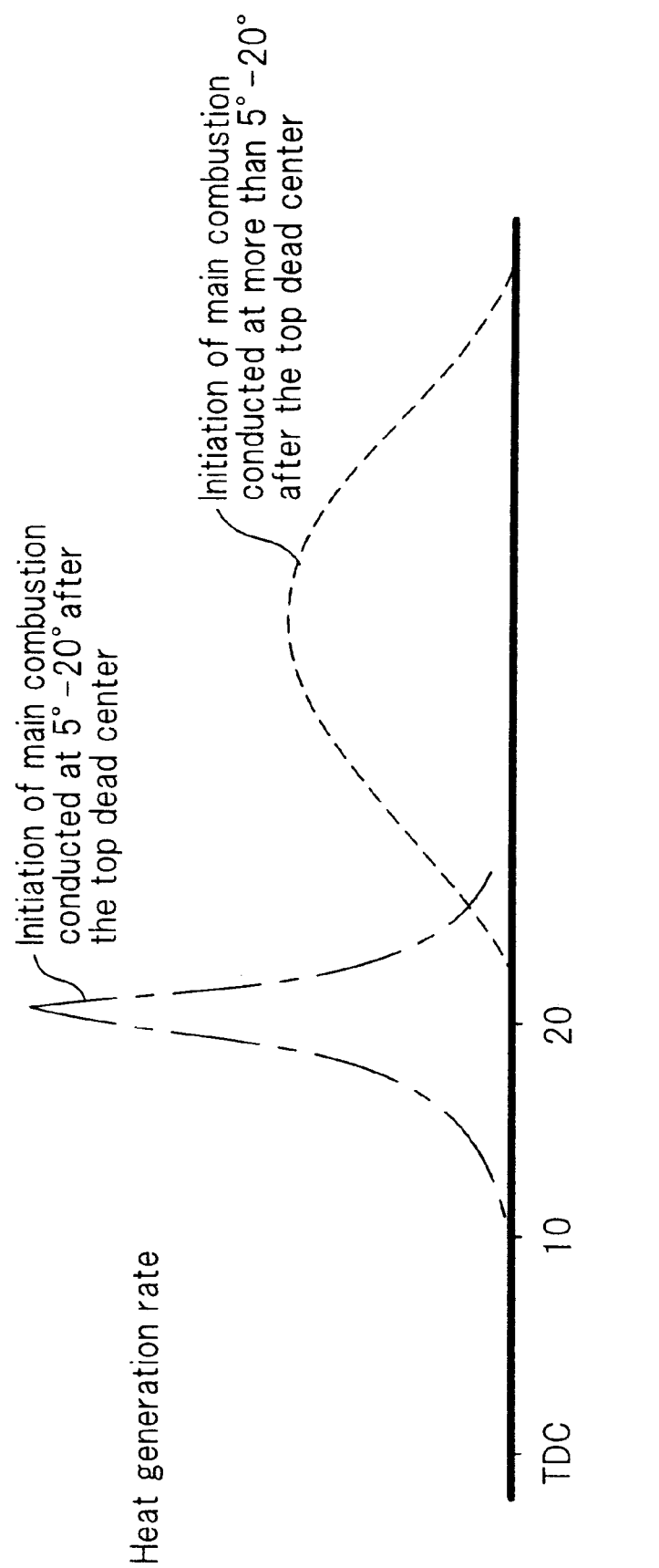
FIG. 5 shows the characteristics of the rate of heat generation as related to differences in the initial combustion period.

FIG. 5 shows the differences in the rate of heat generation depending on the combustion initiation period. As can be understood from the figure, when the initiation of combustion is below 20° of the compression top dead center, the pattern of the ratio of heat generation is as shown by the dotted line, that is to say, a characteristic pattern is not obtained for the heat generation rate during low temperature pre-mixed combustion as shown by the dotted line.

In this way, the fact that the temperature increase rate after combustion initiation is above a fixed value and the fact that initial combustion temperature t2 as shown above exceeds a target temperature T1 satisfy the conditions for the performance of low temperature pre-mixed combustion. These facts can be experimentally confirmed.

Next the control region for combustion will be explained with reference to FIG. 6.

Figure 6:
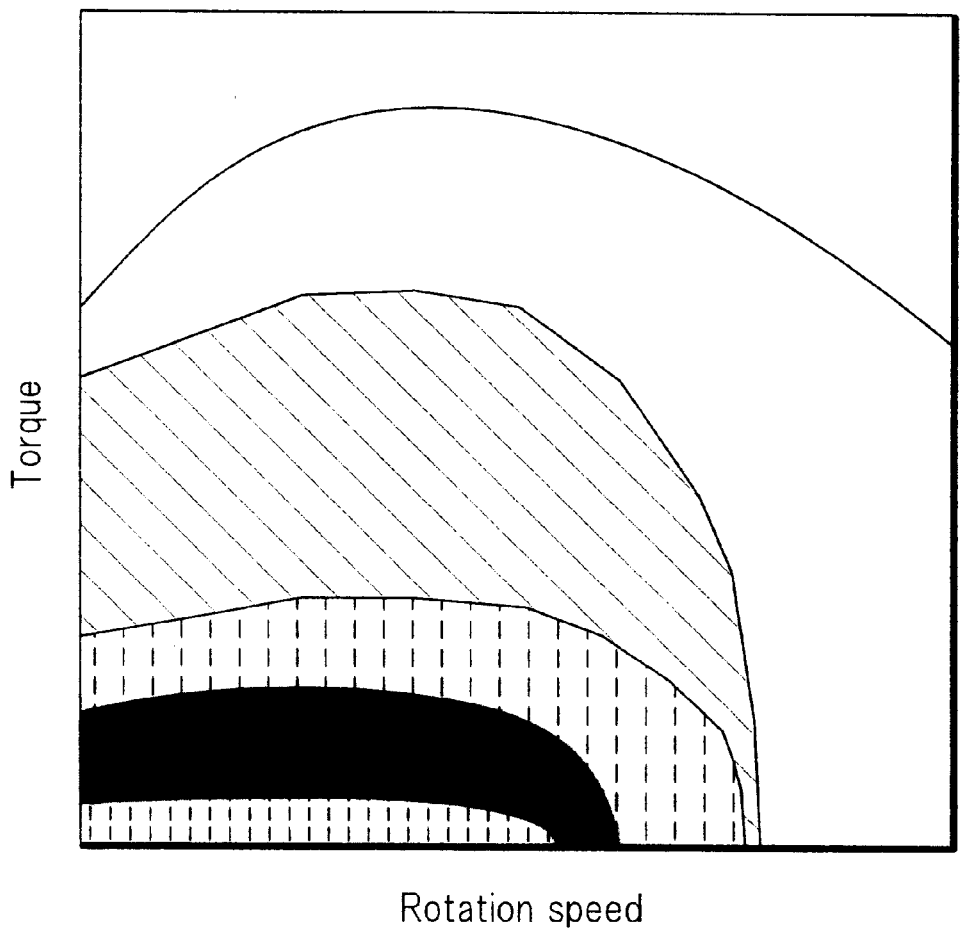
FIG. 6 shows the divisions of control regions related to engine rotation speed and engine load.

FIG. 6 shows a control region for combustion which corresponds to rotation speed and engine load (engine torque). The initial temperature of combustion t2 is related to rotation speed and engine load.

In the present invention, the low temperature pre-mixed combustion region is further extended on the high load side, as shown above, by again making the compression ratio lower than the conventional engine (in contrast to the conventional engine which has a compression ratio which is below 18, the present invention has a compression ratio which is below 16).

As a result, during low load, the initial combustion temperature may become too low and the temperature may diverge from the region in which low temperature pre-mixed combustion is possible. Thus in order to raise the combustion temperature, firstly the intake valve closure period is advanced up to the proximity of the intake bottom dead center and the actual compression ratio is raised. When only advanced the intake valve closure period is no longer sufficient, this is supplemented by lowering the swirl ratio and performing turbo charging in order to further raise the actual compression ratio further raise the temperature. When the above is no longer sufficient for example during extremely low load, the initial temperature for combustion is raised until low temperature pre-mixed combustion is possible by adding a pilot injection and performing preliminary combustion.

The control performed in each region shown in FIG. 6 will be explained in detail with reference to FIG. 7.

(1) Region A

In order to stop EGR at maximum load, the oxygen concentration is increased, and in order to achieve a high supercharging pressure, the initial combustion temperature is raised. That is to say, normal diesel combustion is performed.

(2) Region B

This region is the low temperature pre-mixed combustion region where load is smaller than maximum load. Oxygen concentration is reduced by large degrees of EGR. Furthermore the intake temperature is controlled by lowering the temperature of the EGR gases by the cooling device 7 and thus the initial combustion temperature is lowered by retarding the main injection period and by reducing the supercharging pressure. In this way, the ignition lag period of lengthened and sufficiently vaporized fuel is dispersed into the cylinder before the initiation of combustion and thus low temperature pre-mixed combustion is achieved.

(3) C Region

Since the initial combustion temperature is lower than the initial combustion temperature during low temperature pre-mixed combustion due to reductions in the temperature of EGR gases as a result of reductions in load, the intake valve closure period which is delayed more than the intake bottom dead center is advanced to a position adjacent to the intake bottom dead center and the initial combustion temperature is raised by increasing the actual compression ratio.

(4) D Region

In Regions D and E where load is further lowered, the problem of lowered combustion speed and and sharp increases in white smoke burning arise when the oxygen concentration is maintained to the same low state as in Region C. Thus in the case of the conventional engine above, the oxygen concentration was increased by reducing the amount of EGR. Initial combustion was advanced and partial combustion suppressed by advancing the injection period.

In contrast, in Region D of the present invention, firstly the swirl is weakened in order to reduce cooling loss during the compression process. However if this remains the case, combustion is adversely affected by the reduction in the swirl ratio. Thus a turbo-charger increases the boost pressure and the amount of intake gas is increased. In such a way, it is possible to increase the amount of operational gases by the degree to which the swirl ratio has decreased and a high angular motion energy can be maintained even at the compression top dead center. Furthermore since the supercharging raises the intake temperature and increases the actual compression ratio. The initial combustion temperature is raised in turn.

(5) E Region

Since it is necessary to further raise the initial combustion temperature during extremely low load (for example when the engine is idling), a pilot injection comprising a small amount of fuel is injected before main combustion and thus the gas temperature in the combustion chamber at initiation of main combustion is raised by the combustion of the pilot fuel. Main injection is performed after the combustion of the pilot injection is completed and the main injection timing and the pilot injection amount and timing are controlled so that the initiation of main combustion is performed between 5° to 20° after the compression top dead center. To take an example, in the vicinity of an idling region of the engine, the pilot injection timing is set to 35° before the compression top dead center, the pilot injection amount is set to 1 mm$^3$/st, and the main combustion timing is set to 3° before the compression top dead center. The reason that main combustion is performed after the termination of combustion of the pilot fuel injection, is that the present invention has the object of increasing the initial combustion temperature by the pilot injection (therefore it is not desirable to advance the ignition of the main combustion). It is also because the present invention has the object of igniting the main combustion definitely after the ignition lag period.

Figure 7:
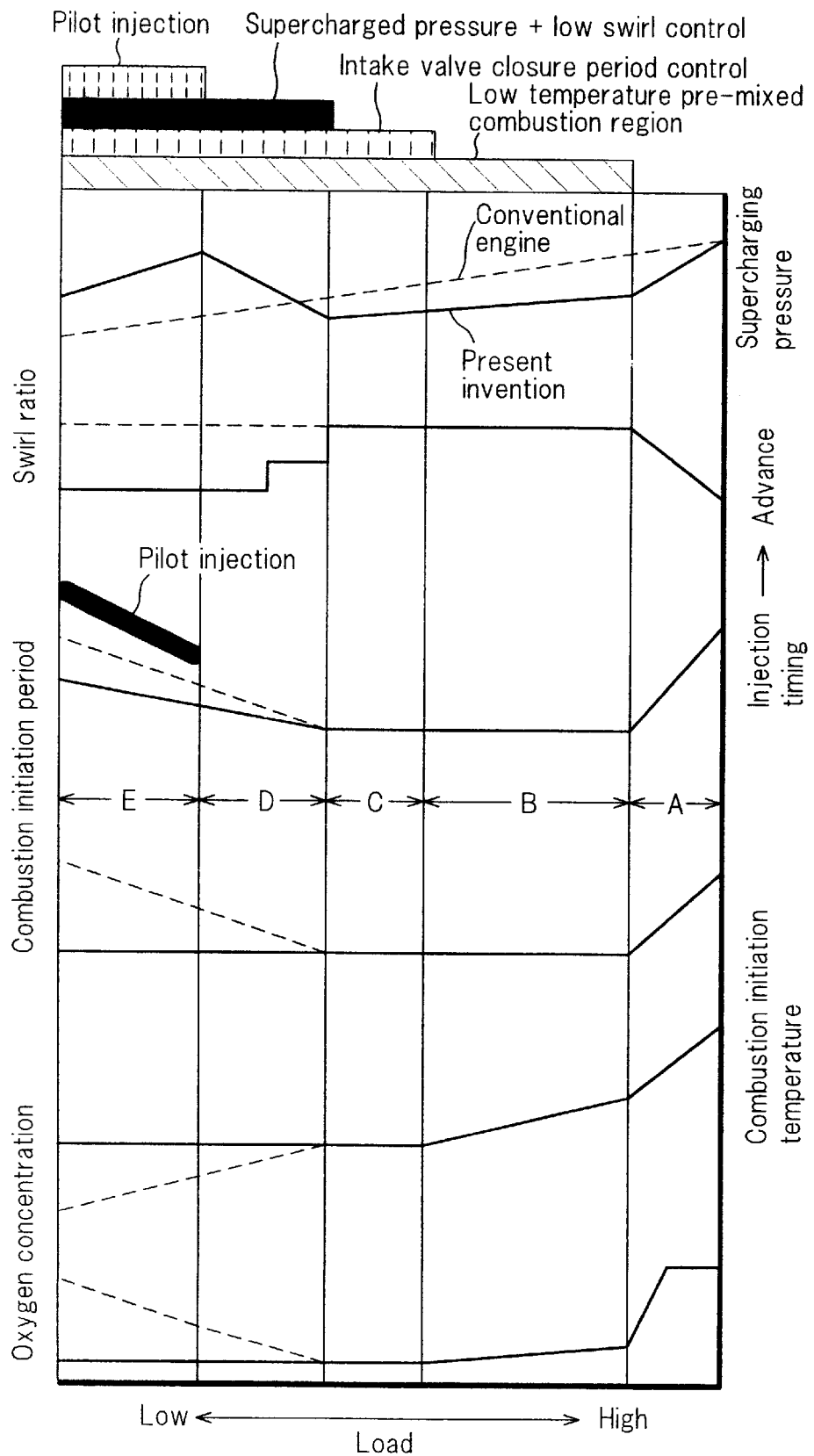
FIG. 7 explains the characteristics of control of each region in FIG. 6.
Figure 8:
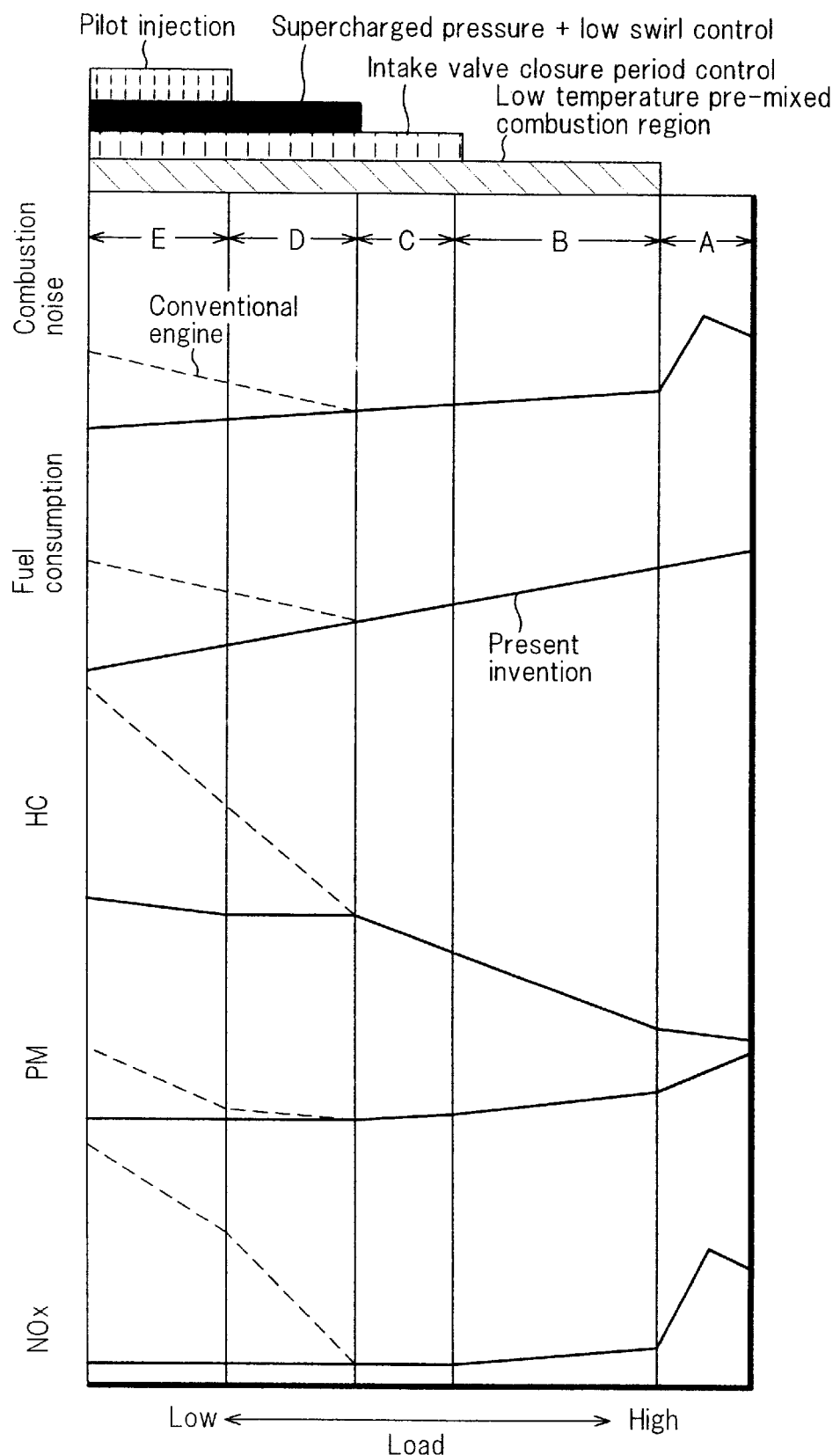
FIG. 8 shows the emission characteristics of $NO_x$ and the like during the control shown in FIG. 7.

The results of the control performed in FIG. 7 are shown in FIG. 8. In the conventional engine above, apart from the fact that in Regions D and E, emissions of $NO_x$ are increased by reductions in the amount of EGR and advancing the injection period, combustion noise and fuel efficiency, HC, PM (in particular SOF) are increased due to the fact that low temperature pre-mixed combustion is not performed.

In contrast, in the present invention, since low temperature pre-mixed combustion is possible even in Regions D and E, $NO_x$ emissions, combustion noise and fuel efficiency, HC, PM (in particular SOP) are reduced to a level equivalent to that in Region B (HC is slightly higher than that in Region B and fuel efficiency is higher than Region B).

Figure 9:
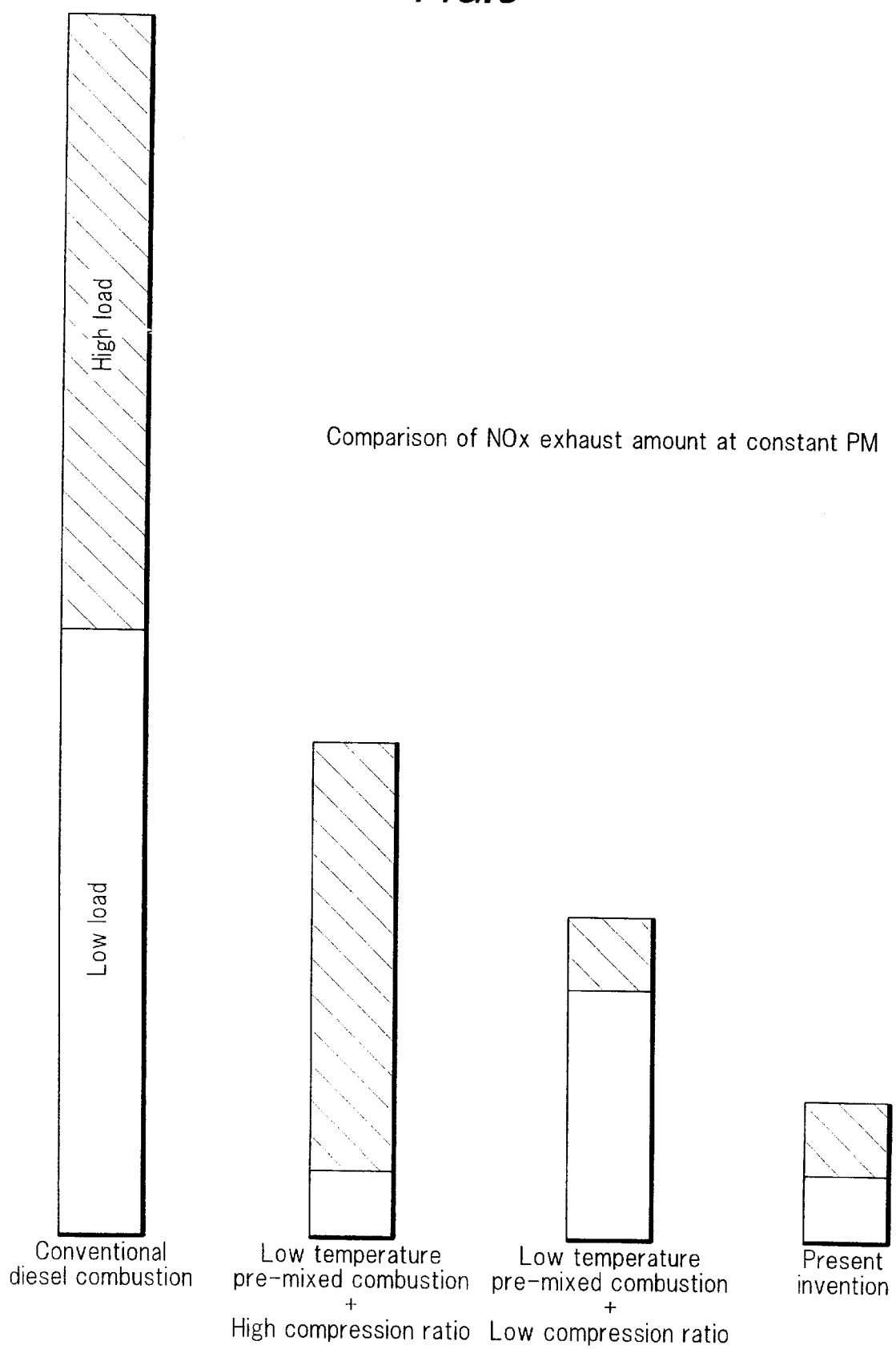
FIG. 9 shows the characteristics of a comparison of $NO_x$ emission at constant PM during vehicle running mode.

FIG. 9 is a comparison of $NO_x$ exhaust emission levels at equal amounts of PM exhausted when the vehicle is in an experimental running mode. During low temperature pre-mixed combustion at a high compression ratio, the exhaust rate of $NO_x$ during high load is high. However the exhaust rate of $NO_x$ during high load is reduced by lowering the compression ratio in the conventional engine. However since the EGR ratio is lowered in order to prevent miss fire or the like at low load, $NO_x$ emissions are greatly increased at low load.

In contrast, since the present invention can reduce $NO_x$ emissions at low load and on a comparison with low temperature pre-mixed combustion at high compression ratios, the total emission of $NO_x$ is reduced to less than $\frac{1}{3}$.

Figure 10:
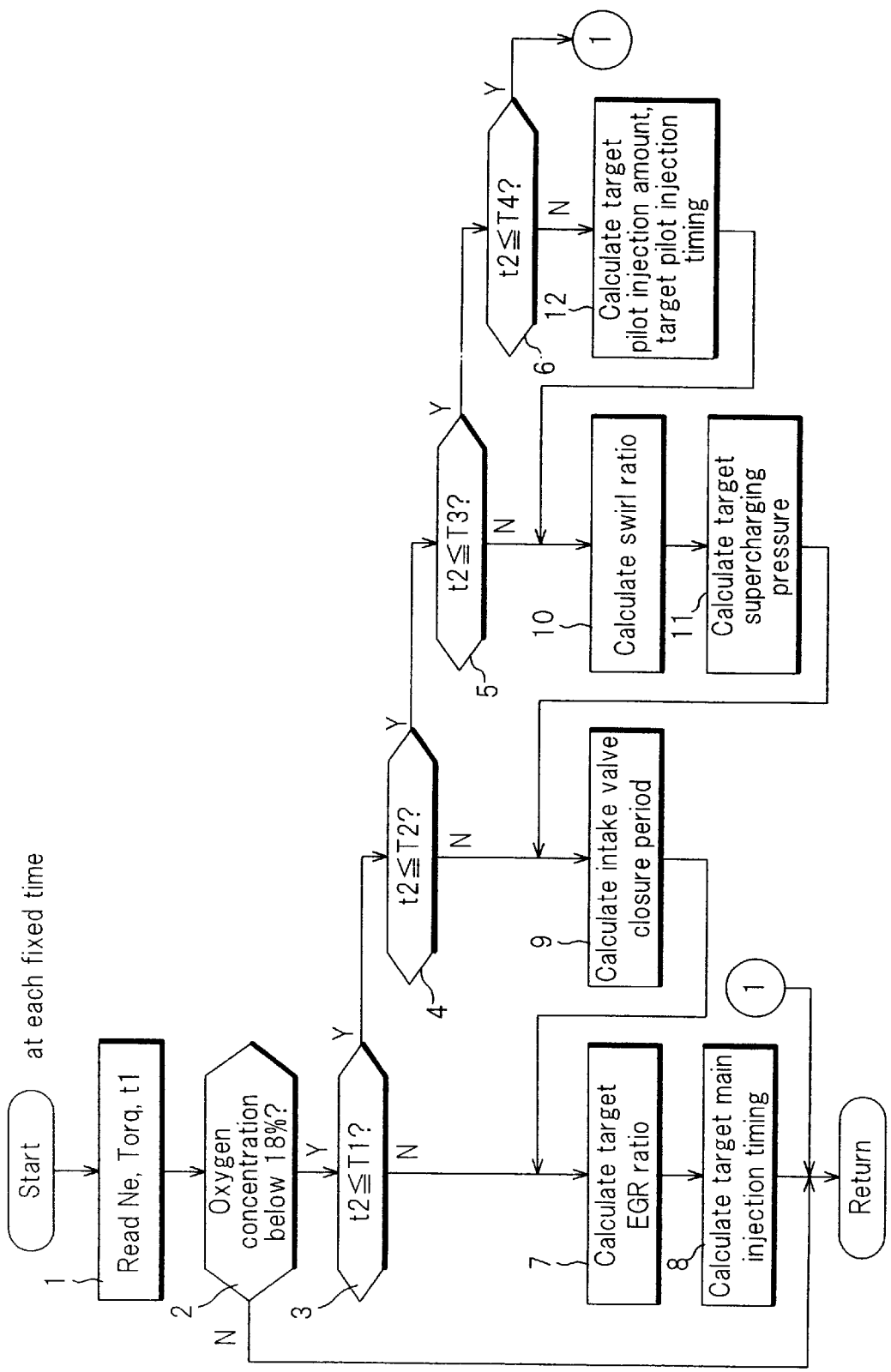
FIG. 10 is a flowchart which explains the details of control.

The flowchart in FIG. 10 shows the details of control performed to operate the temperature increase device in order to enable low temperature pre-mixed combustion in low load regions and the like. Such control is performed at each fixed period.

In a step S1, an engine rotation speed Ne, a target engine torque Torq which is an engine load, and an intake manifold temperature t1 (detected by a temperature sensor (not shown) are read. Then in a step S2, the actual oxygen concentration and a set value (for example an oxygen concentration of 18%) are compared.

A set value with an oxygen concentration of 18% is the upper limit of oxygen concentration when low temperature pre-mixed combustion is performed. Thus if the actual oxygen concentration is below 18%, when the region for low temperature pre-mixed combustion exceeds 18%, it is possible to determine that combustion is taking place in a non low temperature pre-mixed combustion system. The oxygen concentration is varied by regulating the rate of recirculated exhaust gases.

The actual oxygen concentration is determined by using detected values which are detected by a fuel/air ratio sensor 38 in the exhaust gas passage 2 and an airflow meter 39 in the intake air passage 3 respectively. Needless to say, a set value (corresponding to an oxygen concentration of 18%) differs depending on the engine.

When combustion is in a low temperature pre-mixed combustion region, the routine proceeds to steps S3, S4, S5, S6 and the region is determined by the comparison of target temperatures T1, T2, T3, T4 (however where T1>T2>T3>T4 with an initial combustion temperature t2.

The target temperatures T1, T2, T3, T4 are set depending on the rotation speed and load of the engine. For example, the maps shown in FIGS. 20, 21, 22 and 23 are determined based on rotation speed Ne and load (or target engine torque or fuel injection amount) and the target temperatures are decided by referring to the maps.

The relationship between the temperature regions and the regions shown in FIG. 7 are as shown below.

Region B: t2>T1

Region C: T1≧t2>T2

Region D: T2≧t2>T3

Region E: T3≧t2>T4

The determined region may be thought of as acting to detect a map such as that shown in FIG. 6 by rotation speed and load. In this case, when the intake temperature differs from the matching temperature, the accuracy of the region determination is lowered. For example, by varying the intake temperature, since the initial combustion temperature is lower in winter than in summer, if it is assumed that the shift in the temperature region from T1 to T2 in summer will continue to fall from T2 to T3 in winter, control by the swirl control valve and control by the turbo-charger must be added based on the difference between summer and winter.

However the variation of the intake temperature is not represented in the characteristics map in FIG. 6. Thus if the map characteristics in FIG. 6 are matched to those for summer, only summer type control can be performed even in winter (in this case, no supercharging control or swirl valve control is performed) and the combustion temperature will not reach a target attainable temperature.

In contrast, when the region is determined by the combustion temperature, it is possible to carry out control depending on the variation of the intake temperature (in winter, it is possible to add supercharging control and swirl valve control).

The above initial combustion temperature t2 above has a correlation up to an intake manifold temperature t1:

$$t2 = t1 \cdot \epsilon^{\kappa-1}$$

where however $\epsilon$: compression ratio $\kappa$: proportional heat ratio ($\approx 1.3$)

Thus it is possible to calculate the initial combustion temperature t2 from the intake manifold temperature t1. Of course it is possible to estimate the intake manifold temperature t1 from the formula $$t1 = Ta \cdot (760 + Boost)/760$$

based on the intake temperature Ta and the intake Boost.

Figure 11:
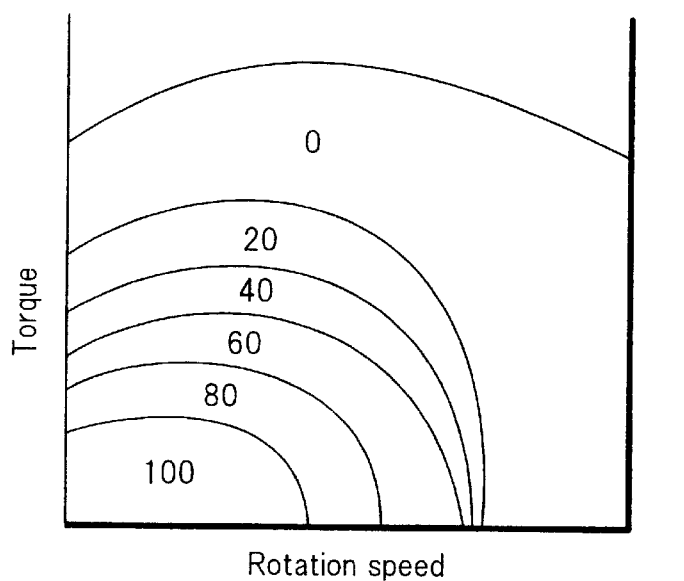
FIG. 11 shows the characteristics of the target EGR ratio.
Figure 12:
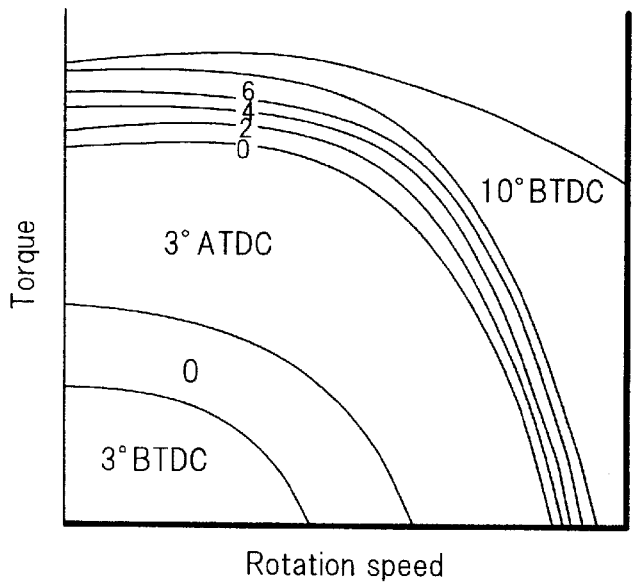
FIG. 12 shows the characteristics of the principal target injection period.

① When t2>T1, the routine proceeds to steps S7 and S8 and a target EGR ratio and target main injection period (target main injection initiation period) are calculated by referring to the map, which shows the content of FIGS. 11 and 12, based on rotation speed Ne and target engine torque Torq for low temperature pre-mixed combustion.

Figure 13:
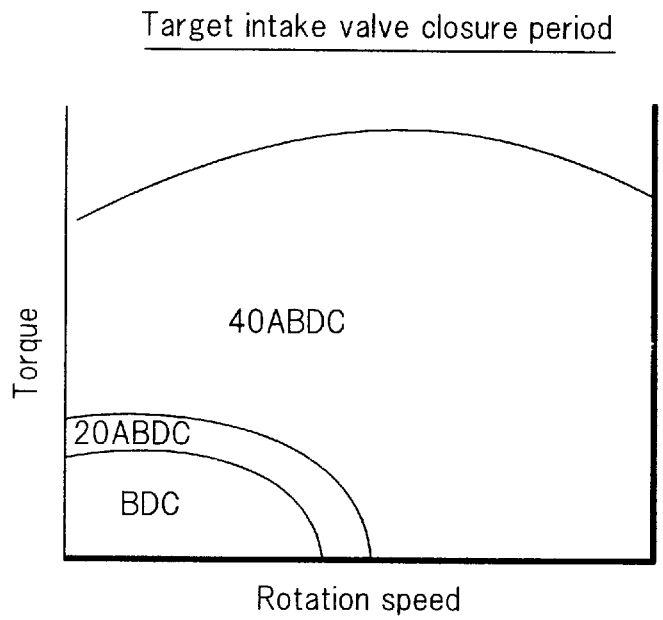
FIG. 13 shows the characteristics of the target closure period for the intake valve.

② When T1≧t2>T2, the routine proceeds to step S9, and after a target intake valve closure period is calculated by referring to the map in FIG. 13 based on rotation speed Ne and target engine torque Torq, the operation in steps S7 and S8 are executed.

Normally the actual compression ratio is increased and the initial combustion temperature is raised by advancing the intake valve closure period set after the intake bottom dead center to be adjacent to the bottom dead center.

Figure 14:
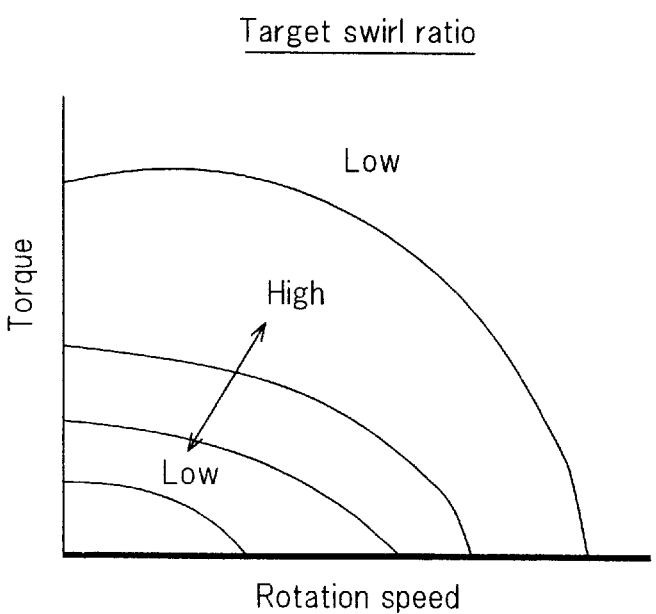
FIG. 14 shows the characteristics of the target swirl ratio.
Figure 15:
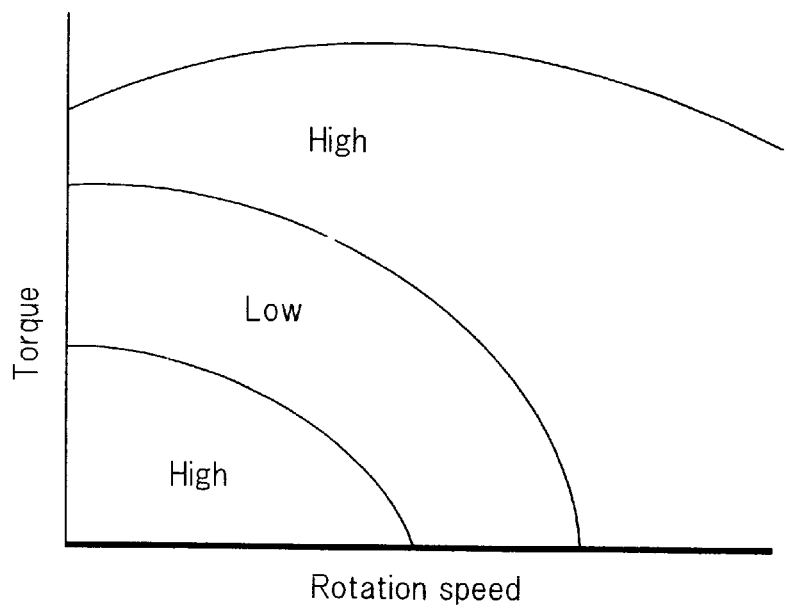
FIG. 15 shows the characteristics of the target supercharging.

③ When T2≧t2>T3, the routine proceeds to steps S10 and S11, and after a target supercharging pressure and a target swirl ratio are calculated by referring to the map in FIG. 14 and FIG. 15 based on rotation speed Ne and target engine torque Torq, the operation of steps S9, S7 and S8 is executed.

Thus the actual compression ratio is raised by increasing the supercharging pressure. Thus the initial combustion temperature is correspondingly raised. Furthermore by reducing the swirl ratio and thus weakening the swirl, the heat exchange rate of the operational gas in the cylinder is lowered. Thus cooling loss is reduced, and temperature reductions of the operational gas are suppressed. The above are related to rises in the initial combustion temperature.

Figure 16:
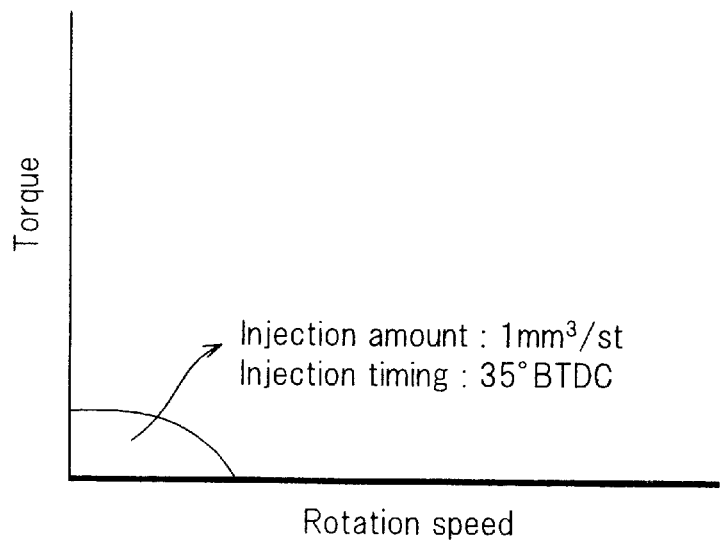
FIG. 16 shows the characteristics of the target pilot injection amount and target pilot injection timing.

④ When T3≧t2>T4, the routine proceeds to step S12, and after a target pilot injection amount and a target pilot injection timing are calculated by referring to the map in FIG. 16 based on rotation speed Ne and target engine torque Torq, the operation in steps S10, S11, S9, S7 and S8 is executed.

Thus the temperature of the operational gas in the cylinder and the initial combustion temperature are raised by a pilot injection.

In FIG. 16, data is entered in the small region in the lower left of the figure so that the pilot fuel injection is set so that the target pilot injection timing is 35° before the compression upper dead point, and the pilot injection amount is 1 mm³/st.

Control of the injection period is performed using a target main injection timing and EGR valve control which uses a target EGR ratio in the temperature region t2>T1 due to a flow (not shown).

In contrast, in the temperature region T1≧t2>T2, control of the intake valve closure period is performed by advancing the closure of the intake valve using a target intake valve closure period in addition to the above control.

Furthermore in the temperature region T2≧t2>T3, control of the supercharging pressure is performed using a target supercharging pressure and control of the swirl valve using a target swirl ratio in addition to each above control.

When in the temperature region T3≧t2>T4, pilot injection control using a target pilot injection timing and a target pilot injection amount are respectively performed in addition to all the above control.

Figure 17:
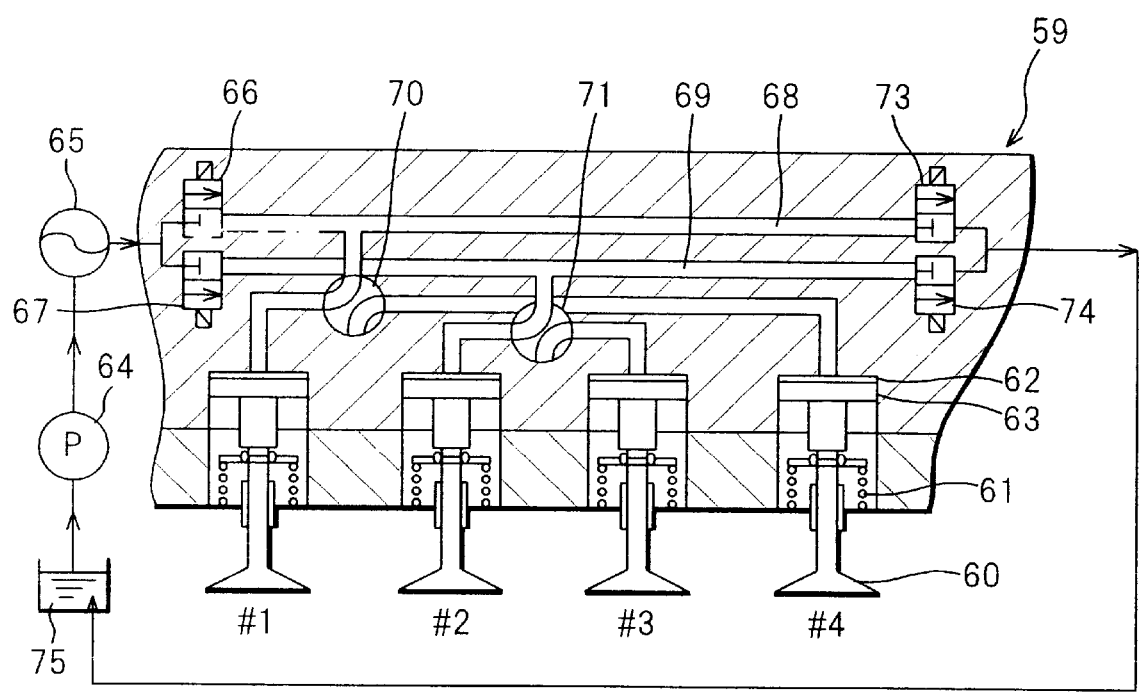
FIG. 17 is a schematic view showing the mechanism of variable valve timing.

Thus a mechanism for example such as that shown in FIG. 17 can be employed as means of regulating the intake valve closure period.

In the figures, reference numeral 60 denotes an intake valve, 61 is a valve spring which compresses the intake valve 60 in the direction of closure. A piston 63 is provided which contacts with the upper end of each intake valve 60. The piston 63 is restrained by the valve spring 61 and is depressed due to the oil pressure which is lead into the oil pressure chamber 62. Thus the intake valve 60 is opened.

The working oil which is discharged from the oil pump 64 is supplied selectively to the oil passage 68, 69 from an accumulator through an electrical switching valve 66, 67 on the input mouth side. Furthermore each intake valve 60 is opened in order by selectively supplying the #1 cylinder, the #4 cylinder, the #2 cylinder, the #3 cylinder in each oil pressure cylinder through the rotary valves 70, 71 which rotate in synchrony with the engine rotations.

Each intake valve 60 is closed in order by selectively evacuating the working oil of each oil pressure chamber 62 to the tank 75 through the exit electrical switching valve 73, 74 from the oil passage 68, 69. The closure period of each intake valve 60 is controlled by controlling the exit electrical switching valve 73, 74.

Thus it is also possible to control the exit electrical switching valve 73, 74 depending on the value of the target intake valve closure period obtained by the executing the flow in FIG. 10 in the variable valve timing mechanism shown in FIG. 17.

In this way, in the present invention, it is possible to enlarge the low temperature pre-mixed combustion region towards high load by lowering the compression ratio to below 16 which is lower than that of conventional engine. Furthermore when the initial combustion temperature is in the temperature region which it is lower than the target temperature T1 at which low temperature pre-mixed combustion is possible, the main combustion period is controlled so that the initiation of main combustion is performed at a fixed period (for example between 5° to 20° of the upper dead point). In addition since temperature increase control is performed based on the temperature region so that the initial combustion temperature exceeds a target temperature T1, it is possible to conduct low temperature pre-mixed combustion in the low load region (low temperature region). That is to say, the low temperature pre-mixed combustion region is enlarged. In this way, improvements over the conventional engine are achieved with respect to all of $NO_x$ emissions, combustion noise, fuel efficiency, HC, and PM (refer to FIG. 8).

Next another embodiment of the present invention will be explained based on the flowchart in FIG. 18.

Figure 18:
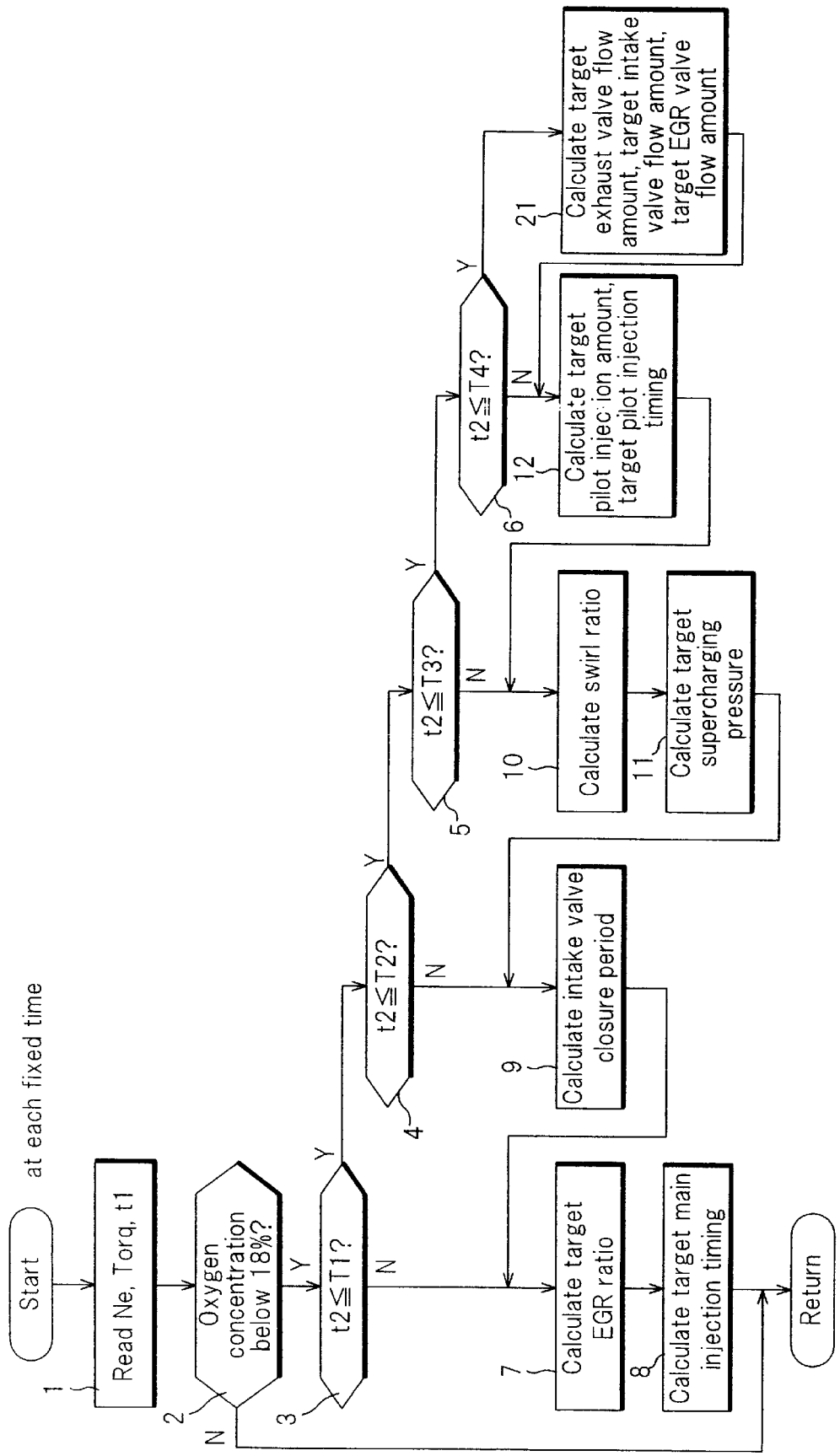
FIG. 18 is a flowchart showing the details of control in a second embodiment of the present invention.

The flowchart in FIG. 18 is related to the flowchart in FIG. 10 displaying the first embodiment and thus, in the figure, similar steps are represented by the same numerals.

The present embodiment is adapted to an engine provided with a plurality, for example 2 exhaust valves in a single cylinder. In order to raise the initial combustion temperature t2 in extremely low temperatures, one of the plural exhaust valves is opened during the gas intake stroke and EGR valve is closed. High temperature exhaust gases are directly reverse flowed into the combustion chamber by opening the exhaust valve. The gas temperature in the combustion chamber is raised and low temperature pre-mixed combustion is enabled even when initial combustion temperature t2 is less than a target temperature T4.

Figure 19:
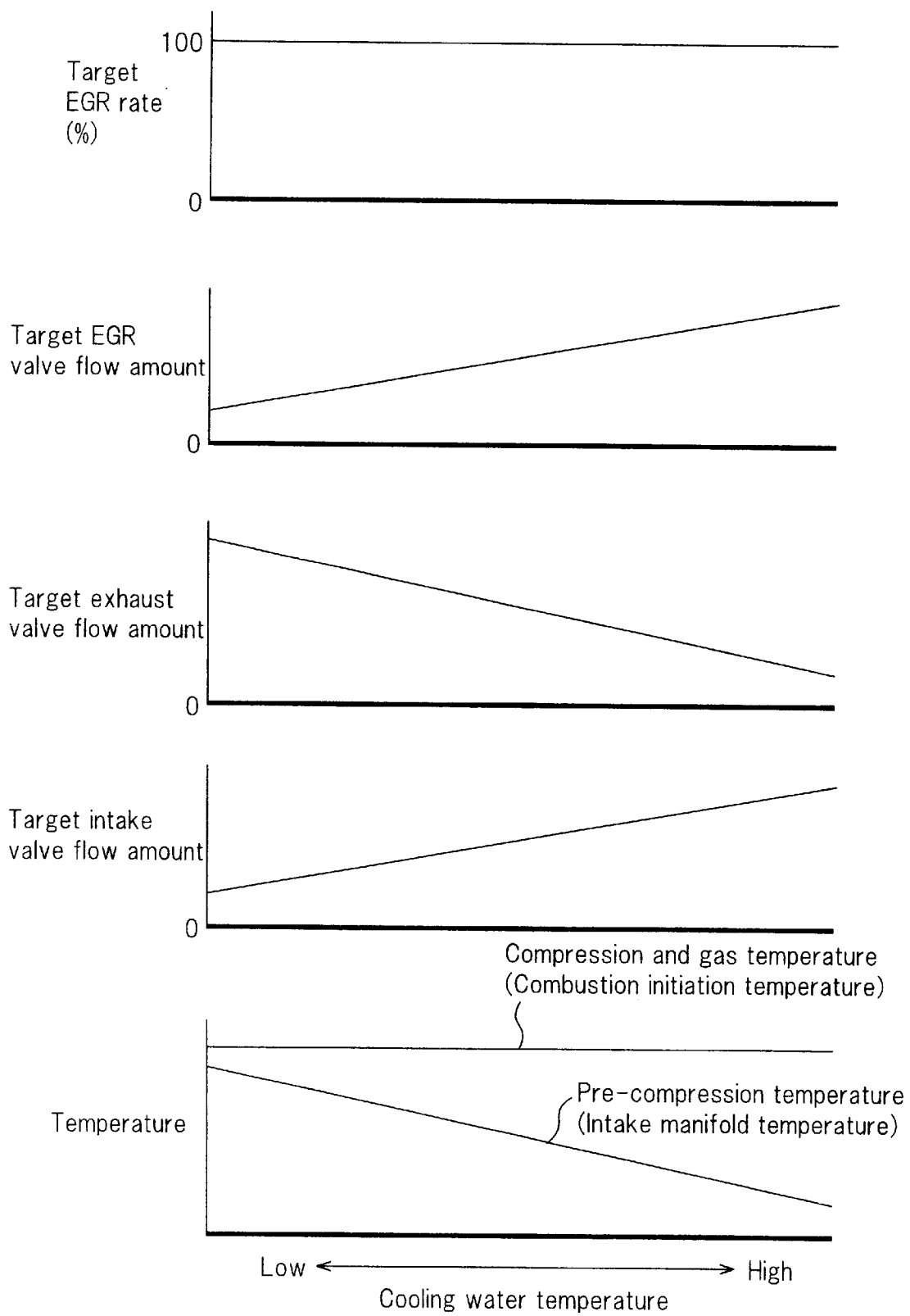
FIG. 19 shows the characteristics of a target EGR valve flow amount, a target exhaust valve flow amount and a target intake valve flow amount.
Figure 20:
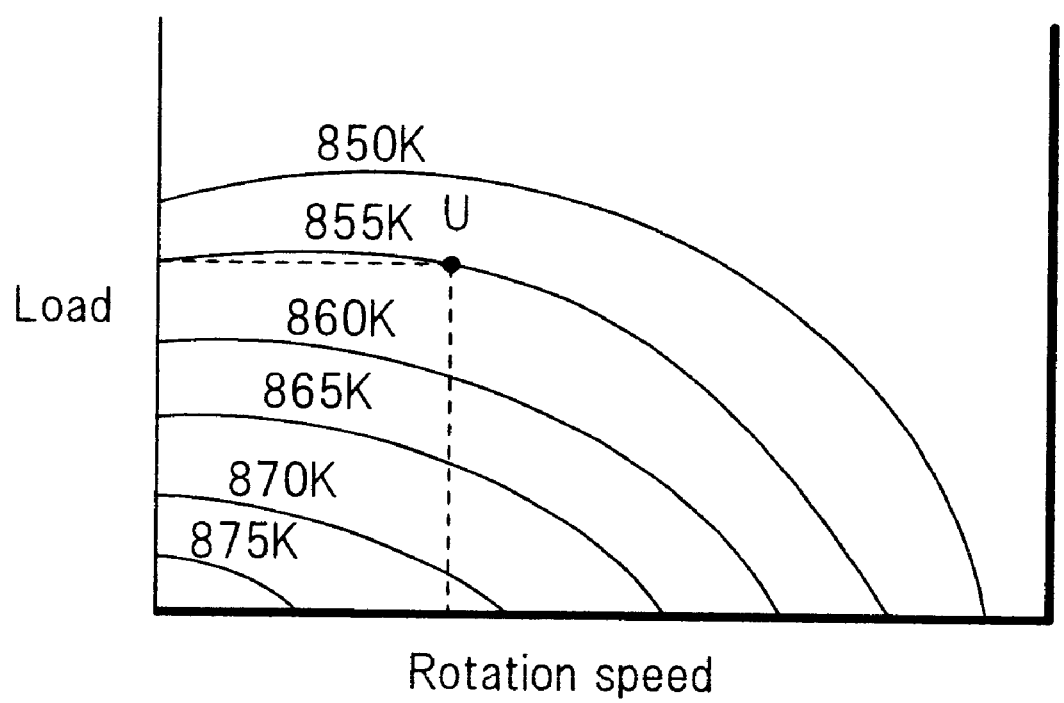
FIG. 20 is a map showing the first target temperature.
Figure 21:
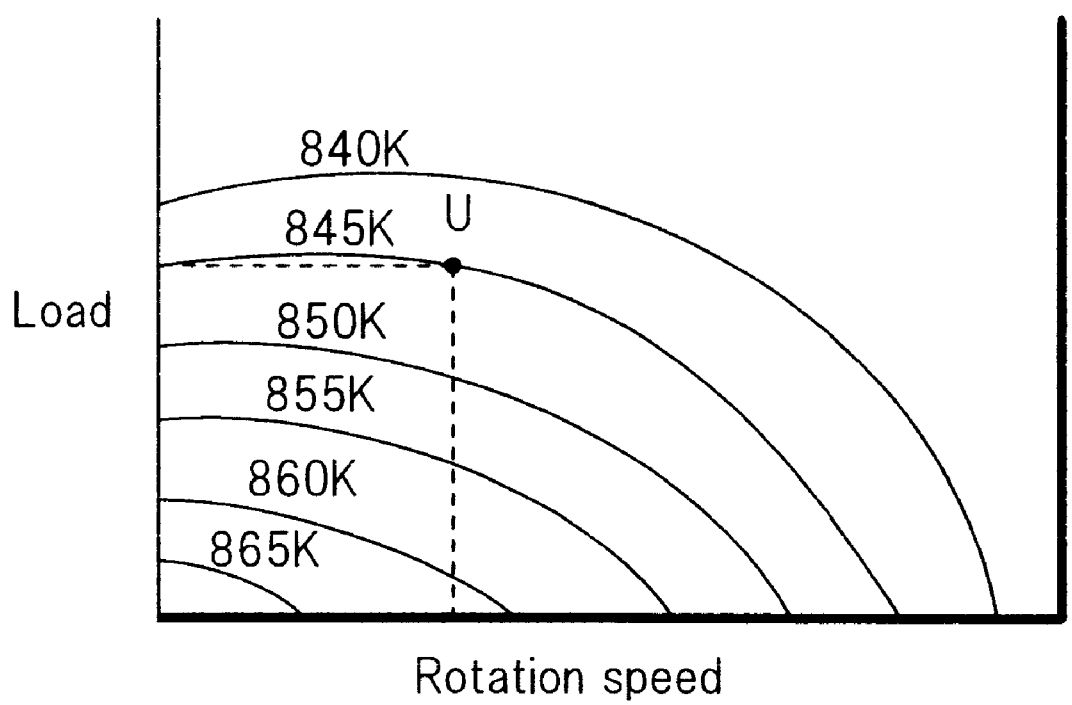
FIG. 21 is a map showing the second target temperature.
Figure 22:
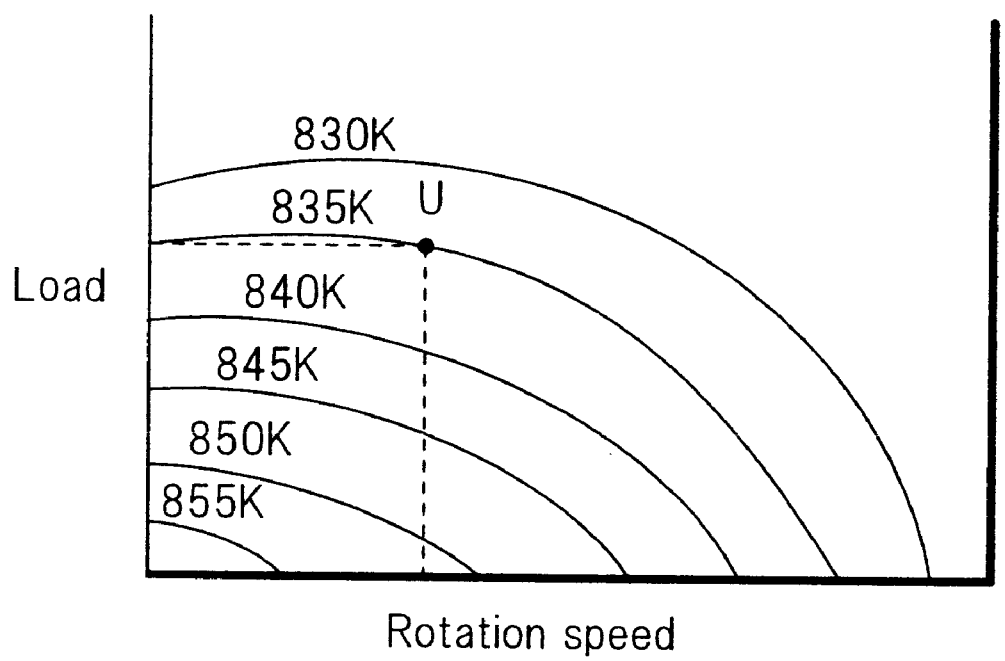
FIG. 22 is a map showing the third target temperature.
Figure 23:
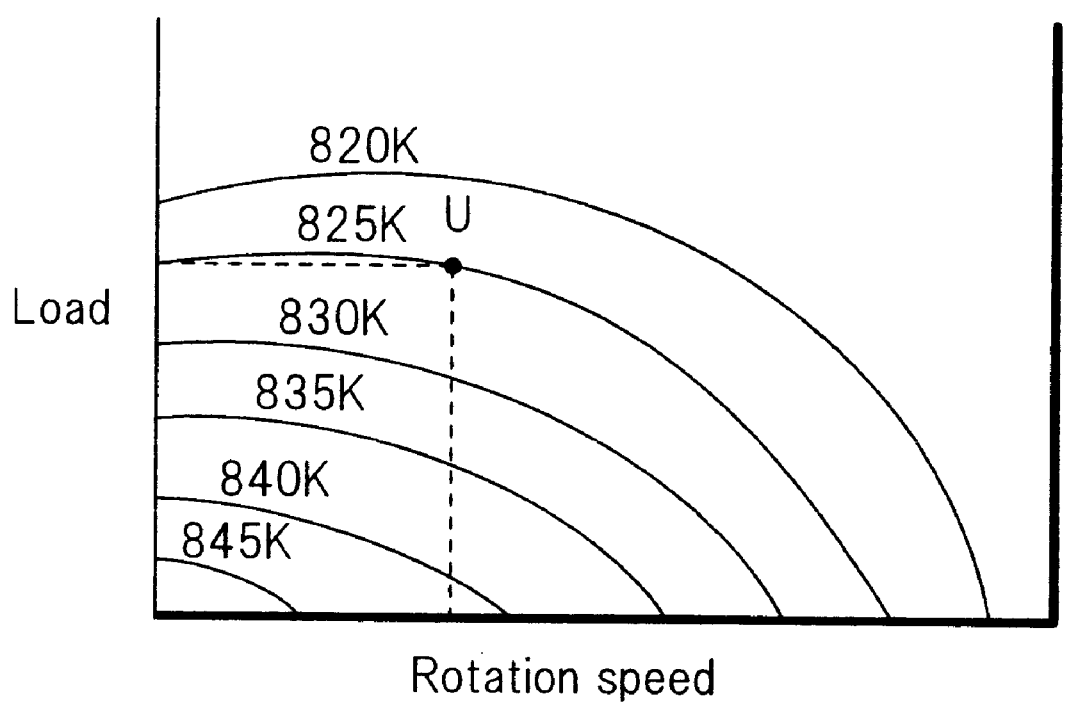
FIG. 23 is a map showing the forth target temperature.

As shown in FIG. 19 for example, the target EGR is considered as 100% (the intake amount and the EGR gas amount being equal). In this case, even when the temperature of the cooling water is decreased, it is necessary to raise the pre-compression temperature (=the temperature t1 of the intake manifold) as the temperature of the cooling water decreases as shown in the figure in order to maintain the maximum compression temperature (=initial compression temperature t2.

The pre-compression temperature sets a balance between the low temperature air flowing through intake passage and the low temperature exhaust gas flowing through the EGR valve, and the high temperature gas reverse flowing into the combustion chamber by opening one of the exhaust valves in the intake process. Therefore in order to agree with the characteristics of the pre-compression temperature graphically, the flow amount of one of the exhaust valves which is opened in the intake process is increased as the temperature of the cooling water is reduced and the intake valve flow amount and the EGR valve flow amount is reduced.

The flowchart in FIG. 18 differs from that in FIG. 10 by only a step S21. That is to say, when the initial combustion temperature t2 is below a target temperature T4, the routine proceeds from a step S6 to a step S21 where a target EGR valve flow amount, a target exhaust valve flow amount and a target intake valve flow amount are calculated based on a cooling water temperature referring to a table set in the same way as FIG. 19. Thereafter the operation of steps S12, S10, S11, S9, S7, S8 are executed in the same way as in embodiment 1.

Then the EGR valve aperture and aperture of the intake valve as well as the degree of exhaust valve closure are controlled in a flow (not shown) so that each calculated target flow amount is achieved by the EGR valve, the exhaust valve and the intake valve.

Furthermore since the swirl in the combustion chamber is weak as a result of the EGR gas reverse flowing to the combustion chamber due to one exhaust valve being open in the intake process, an exhaust gas port is formed in the helical port on the exhaust gas valve side which is open in the intake process in order to prevent reductions in the swirl ratio and so that the reverse flowing gas creates a swirling motion in the combustion chamber.

In this way, when the initial combustion temperature t2 is lower than the target temperature T4, the low temperature EGR gas input into the combustion chamber through the EGR valve and the low temperature intake air are reduced. The high temperature exhaust gas, which reverse flows into the combustion chamber directly by opening one of the exhaust valves during the intake stroke, is increased. However in order to prevent reductions in the strength of the swirl in the combustion chamber which result from the exhaust valve being open at this time, an exhaust gas port for the exhaust gas valve which is open during the intake process is formed in the helical port. As a result, even during extremely low temperatures when the initial combustion temperature t2 is below the target temperature T4, low temperature pre-mixed combustion is possible. As a result, the exhaust emission characteristics when the engine cooling water is at a low temperature are further improved.

Each flow amount of the EGR valve, one of the exhaust valves and the intake valve vary depending on cooling water temperature. However the simplest form of control entails only one of the exhaust valves being open by a fixed aperture, and the EGR valve and the intake valve being closed up to the minimum aperture (this corresponds to the characteristic on the left end of FIG. 19).

The entire contents of Japanese Patent Application P10-50568(filed Mar. 3, 1998) is incorporated herein by reference.

Although the invention has been described above by reference to certain embodiments of the invention, the invention is not limited to the embodiments described above. Modifications and variations of the embodiments described above will occur to those skilled in the art, in light of the above teaching.

The scope of the invention is defined with reference to the following claims.

What is claimed is:

1. A diesel engine provided with an exhaust gas recirculation system which performs low temperature pre-mixed combustion at a low compression ratio, said diesel engine comprising a fuel injection valve which varies a fuel injection timing, a temperature increase control device which raises an operational gas temperature in a combustion chamber, and a control unit which controls said fuel injection valve and said temperature increase control device, wherein said control unit estimates an ambient temperature in a cylinder at initiation of combustion, decides whether or not said ambient temperature in a cylinder at initiation of combustion is in a region lower than a first target temperature which maintains low temperature pre-mixed combustion, performs temperature increase control by operating said temperature increase control device so that an ambient temperature at initiation of combustion exceeds a first target temperature, when it is determined that said ambient temperature at initiation of combustion is in a region which is lower than said first target temperature and regulates a fuel injection timing of said fuel injection valve so that a combustion temperature increase rate is more than a fixed value.

2. A diesel engine as defined in claim 1 wherein said control unit estimates said ambient temperature in a cylinder at initiation of combustion based on said compression ratio and engine load.

3. A diesel engine as defined in claim 1 wherein said control unit estimates said ambient temperature in a cylinder at initiation of combustion based on said compression ratio and intake gas temperature.

4. A diesel engine as defined in claim 1 wherein said control unit controls a fuel injection timing so that initial combustion is in a range of 5° to 20° after the compression top dead center so that said temperature increase rate of main combustion is above said set value.

5. A diesel engine as defined in claim 1 wherein said control unit sets said first target temperature depending on load so that said target temperature decreases as engine load decreases.

6. A diesel engine as defined in claims 1 wherein said temperature control device is provided with an intake valve period control mechanism and wherein said control unit performs temperature increase control by advancing the closure period of said intake valve when an ambient temperature at initiation of combustion is lower than said first target temperature and higher than a second target temperature which is lower than said first target temperature.

7. A diesel engine as defined in claim 6 wherein said temperature control device is further provided with a swirl control device and wherein said control unit performs temperature increase control by lowering a swirl ratio and by advancing said intake valve closure period when said ambient temperature at initiation of combustion is lower than a second target temperature and higher than a third target temperature which is lower than said second target temperature.

8. A diesel engine as defined in claim 7 wherein said temperature control device is further provided with a fuel injection control mechanism and wherein said control unit performs temperature increase control by setting a pilot injection timing so that the pilot injection is performed before the main fuel injection and the combustion of said pilot fuel injection is completed before said main fuel injeciton, by lowering a swirl ratio and by advancing said closure period of said intake valve when an ambient temperature at initiation of combustion is lower than a third target temperature and higher than a fourth target temperature which is lower than said third target temperature.

9. A diesel engine as defined in claim 8 wherein said control unit controls a main fuel injection timing so that a main fuel injection is ignited after the completion of the main fuel injection.

10. A diesel engine as defined by claim 6 wherein said temperature control device is further provided with a supercharging pressure control mechanism and wherein said control unit performs temperature increase control by increasing a supercharging pressure, by lowering a swirl ratio and by advancing said closure period of said intake valve when an ambient temperature at initiation of combustion is lower than a second target temperature and higher than a third target temperature which is lower than said second target temperature.

11. A diesel engine as defined in claim 10 wherein said temperature control device is further provided with a fuel injection control mechanism and wherein said control unit performs temperature increase control by setting a pilot injection timing so that the pilot injection is performed before the main fuel injection and the combustion of said pilot fuel injection is completed before said main fuel injection, by increasing a supercharging pressure and by lowering a swirl ratio and by advancing said closure period of said intake valve when an ambient temperature at initiation of combustion is lower than a third target temperature and higher than a fourth target temperature which is lower than said third target temperature.

12. A diesel engine as defined by claim 11 wherein said temperature control device is provided with a valve opening and closing mechanism for an exhaust gas valve which can arbitrarily control the opening and closing period of one exhaust valve of a plurality of exhaust valves provided with respect to one cylinder, an intake valve control device which can regulate the opening and closing period of an intake valve arbitrarily and an EGR valve which controls an exhaust gas amount which is recirculated into intake gases and wherein said control unit performs temperature increase control by opening one exhaust valve during the intake stroke to increase the amount of exhaust gas, which reverse flows into the combustion chamber, as the temperature of the cooling water decreases, by reducing the amount of air intake and EGR gas which flow into the combustion chamber through said EGR valve as the temperature of the cooling water decreases, by operating a pilot injection so that a main fuel injection is performed after the combustion of said pilot fuel injection is completed, by increasing a supercharging pressure and by lowering a swirl ratio and by advancing said closure period of said intake valve when an ambient temperature at initiation of combustion is lower a fourth target temperature.

13. A diesel engine as defined in claim 11 wherein said temperature control device is farther provided with a valve opening and closing mechanism which can arbitrarily control the opening and closing period of one exhaust valve of a plurality of exhaust valves provided with respect to one cylinder and an EGR valve which controls an exhaust gas amount which is recirculated into intake gases, and wherein said control unit performs temperature increase control by closing said EGR valve and opening one of said exhaust valves in the gas intake stroke, to increase the amount of exhaust gas which reverse flows into the combustion chamber, by operating a pilot injection so that a main fuel injection is performed after the combustion of said pilot fuel injection is completed, by increasing a supercharging pressure and by lowering a swirl ratio and by advancing said closure period of said intake valve when an ambient temperature at initiation of combustion is lower than a fourth target temperature.

14. A diesel engine as defined in claim 12 wherein an exhaust gas port of one of said exhaust valves which open in said intake stroke is formed on a helical port.

* * * * *